(No Model.) 2 Sheets—Sheet 1.
J. A. DUPUIS
BRICK.
No. 257,155. Patented May 2, 1882.
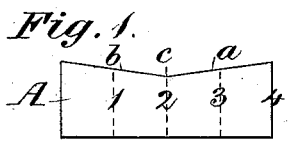
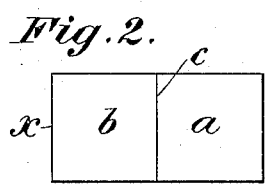
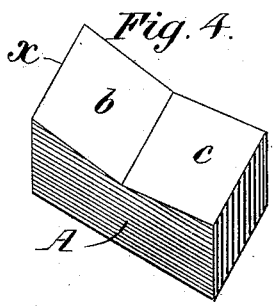
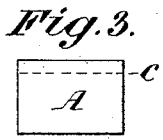
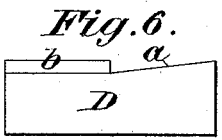
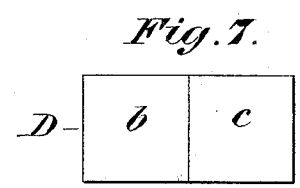
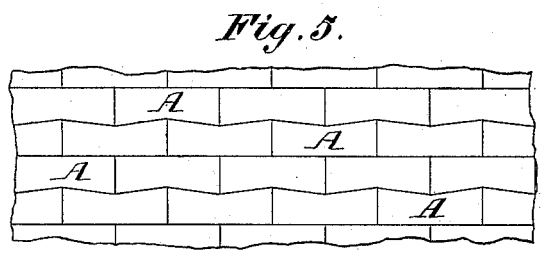
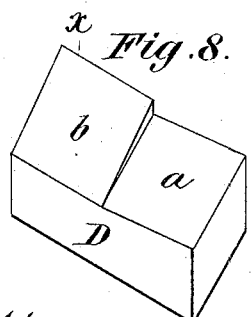
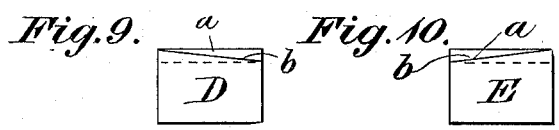
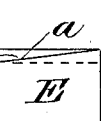
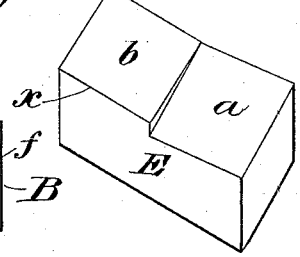
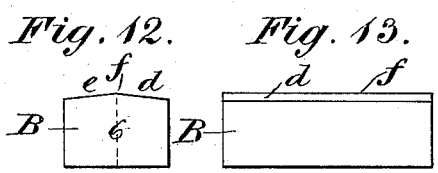
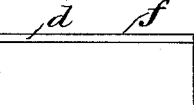
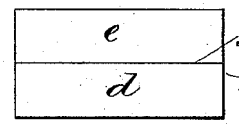
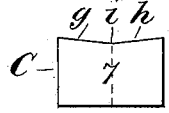
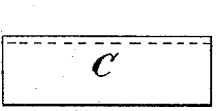
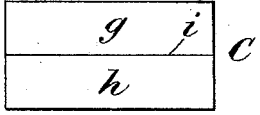
Witnesses　　　　　　　　　Inventor
H. Irwin　　　　　　　　　　J. A. Dupuis
W. H. Barnett　　　Per Charles G. L. Simpson
　　　　　　　　　　　Attorney (No Model.)
J. A. DUPUIS.
BRICK
No. 257,155.
Patented May 2, 1882.
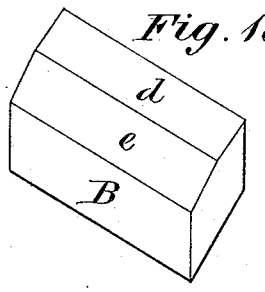
Fig. 15.
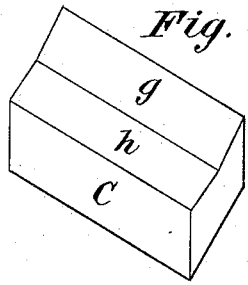
Fig. 19.
Fig. 20.
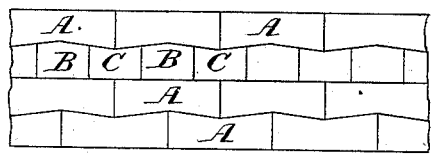
Fig. 21.
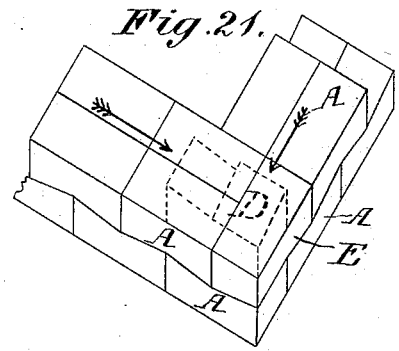
Fig. 22.
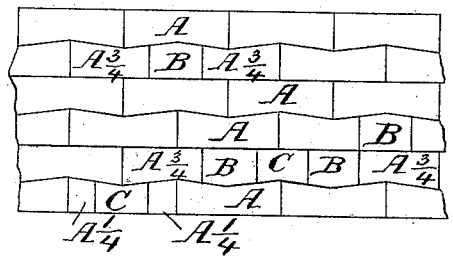
Witnesses
H. Irwin
W. H. Barnett
Inventor
J. A. Dupuis
Per Charles G. K. Simpson
Attorney

UNITED STATES PATENT OFFICE.

JOSEPH A. DUPUIS, OF MONTREAL, QUEBEC, CANADA.

BRICK.

SPECIFICATION forming part of Letters Patent No. 257,155, dated May 2, 1882.

Application filed February 2, 1882. (No model.)

*To all whom it may concern:*

Be it known that I, JOSEPH ALEXANDER DUPUIS, of the city and district of Montreal, Province of Quebec, Canada, painter, have invented certain new and useful Improvements in Bricks; and I do hereby declare that the following is a full, clear, and exact description of the same.

This invention has reference to an improved formation or configuration of bricks to enable the bricks in a wall to interlock, the one with the other, to prevent the cracks and rents which at present usually take place in buildings or walls after they have stood a greater or less length of time. It provides the several forms of bricks which will be hereinafter fully described and shown, which said several forms are all useful in combination (if not necessary) to make my system suitable for plain wall-work, tie-layers, or tie-bricks, and angles or corners.

In the drawings hereunto annexed similar letters of reference indicate like parts, and Figures 1, 2, 3, and 4 are respectively a side elevation, a plan, an end elevation, and an isometrical view of the form of brick to be used in the body of plain straight wall-work. Fig. 5 shows the manner of laying the brick constructed as shown in Figs. 1 to 4. Figs. 6, 7, 8, and 9 are respectively a side elevation, plan, isometrical view, and an end elevation of a modification of brick to be used, in combination with bricks made according to Fig. 1, at the corners or angles, or at ends of rows or layers, as at door and window openings in walls. Figs. 10 and 11 represent the same brick shown in Figs. 6 to 9, only that the transverse bevel on it is set the opposite way to that shown in those figures, so that if I say that the one has a right-hand transverse bevel it would seem natural to say that the other has a left-hand bevel, as clearly seen by comparison of Figs. 9 and 10. Figs. 12, 13, 14, and 15 are respectively an end elevation, side elevation, plan, and isometrical view of a tie-brick. Figs. 16, 17, 18, and 19 are corresponding views of a modification of tie-brick. Figs. 20, 21, and 22 are views showing some of the manners in which the above-mentioned bricks may be laid and combined together.

The brick A, which will be used in the greatest quantity, I will describe first. Its length and breadth I should prefer to make to agree with the size of the common brick in use in the neighborhood, not that there is any absolute necessity for confining myself to any given size, but in case of it being desirable to use the bricks in a wall constructed in part of the old form of bricks, such will be facilitated thereby. The base is rectangular and the sides vertical, and, in fact, thus far the bricks are the same as those at present in use. The difference lies in the upper surface, which is divided into two surfaces, $a\ b$, set longitudinally at an obtuse angle with each other, thereby forming an obtuse channel or groove running transversely of the brick, of which channel the line or angle $c$ is the lowest point. In thickness I should prefer to make this brick so that, taking the average of the thickness at the angle $c$ and one end, the bricks will, when laid together, as in Fig. 5, just be equal to those at present in use. The manner of laying the bricks A in plain straight walls is so clearly shown in Fig. 5 that it will be useless to say anything further about it.

B is one of the tie-bricks. This is in length and width the same size as the brick A. On their top sides they are beveled to agree with the bevel of the surfaces on the top side of A, the beveled surfaces $d\ e$ forming a longitudinal ridge, $f$, on the said top side. The vertical thickness of the brick, as indicated by the line 6, will be equal to the end 4 of the brick A, (see Fig. 1,) and the vertical thickness at the two sides will be equal to the vertical thickness at the line 1 or 3, Fig. 1.

The brick C is the same as B in length and width; but in perpendicular thickness it is made in the center or at line 7 equal to the thickness at line 2, Fig. 1. At the sides it is equal to either of the lines 1 or 3, Fig. 1. Consequently its sides are also equal to the sides of the brick B, and, further, consequently from the above it follows that this brick has a longitudinal groove formed by the beveled surfaces $g\ h$, giving the angle $i$. The manner of laying these bricks as tie-bricks with the bricks A is delineated in Figs. 20 and 22. Any desired number of layers of bricks may be laid plain, as in Fig. 5, and then a layer of tie-bricks, as B C in Fig. 20, may be laid, the usual thing being to lay five rows, as in Fig. 5, and then a row of tie-bricks.

In Fig. 22 is shown the manner of putting single tie-bricks into a wall at any intervals desired. The bricks marked A¼ and A¾ are really properly denominated by the marks, as A¾ is nothing more or less than the brick A with one-quarter cut off its length, and A¼ is the quarter of A cut off, as above mentioned. I do not, however, approve of using such small portions of bricks as A¼, it being much better, in my opinion, to use B and A¾. Two bricks, B, with one, C, between them, and brick A¾ outside of them, would make a very good tie to be put in at intervals, if desired.

We now come to the bricks D and E.

Before proceeding further with this description I would remark that all the bricks mentioned, with the exception of A¼ and A¾, are made in the proportion of twice the breadth gives the length, which is, I believe, the universal proportion in all ordinary bricks now in use.

I do not think I can describe the bricks D and E more simply and clearly than by saying, (looking at Figs. 1, 2, and 4,) suppose the brick A to be cut in two vertically on the line $c$ or 2; now let the $a$ half remain stationary and turn round the $b$ half until the end $x$ comes to the upper side of the figure and place the two halves fairly together in this position and unite them in one piece and you have the brick D. (See Fig. 8.) Similarly turn the $b$ half round to bring the end $x$ to the lower side of the figures and unite the halves and you have the brick E. By Fig. 21 will be understood one way of using the bricks D and E with bricks A to tie in the corners. There are several ways, but having shown one of them any builder of ordinary understanding will understand how they are to be used. Here the brick E in the second layer interlocks by being placed half over two bricks A, as shown, and the third layer is begun by the brick D, placed as shown by dotted lines, brick A being placed to abut with it, which we will suppose to be indicated by the arrows, because if shown by lines they would make a complication of lines and obscure the figure. The fourth layer will be begun with two inverted bricks A, each covering half of the brick D, and thereby interlocking with the brick D.

What I claim, and wish to secure by Letters Patent, is as follows:

1. A brick or building-block for the construction of walls, columns, piers, &c., having inclined bearing-surfaces, and adapted for use as herein described, whereby the structure is securely bound and lateral displacement prevented, as set forth.

2. A wall, column, or pier composed in whole or in part of bricks or blocks having inclined bearing-surfaces, as set forth.

J. A. DUPUIS.

Witnesses:
CHARLES G. C. SIMPSON,
A. A. SIMPSON.